United States Patent [19]
Dziewit, et al.

[11] Patent Number: 5,031,214
[45] Date of Patent: Jul. 9, 1991

[54] DOCUMENT AUTHENTICATION APPARATUS

[76] Inventors: Halina S. Dziewit, 5260 Centennial Trail, Boulder, Colo. 80302; James M. Graziano, 4662 Weld County Rd. 34, Platteville, Colo. 80651

[21] Appl. No.: 614,876

[22] Filed: Nov. 16, 1990

Related U.S. Application Data

[62] Division of Ser. No. 471,570, Jan. 29, 1990, Pat. No. 4,981,370.

[51] Int. Cl.$^5$ .............................................. H04L 9/32
[52] U.S. Cl. ...................................... 380/23; 380/25; 380/49; 364/200; 364/225.4
[58] Field of Search ............... 380/23, 25, 49, 50; 340/825.34; 235/380, 382; 364/222.81, 225.4, 225.6

[56] References Cited

U.S. PATENT DOCUMENTS 4,893,338  1/1990  Pastor .................................. 380/25
4,947,430  8/1990  Chaum .................................. 380/25

Primary Examiner—Linda J. Wallace
Attorney, Agent, or Firm—Dorr, Carson, Sloan & Peterson

[57] ABSTRACT

The document authentication apparatus provides document authentication and authenticity capability. Document authentication requires that the person to be charged apply an authenticating mark on the document indicating intent to authenticate the document. This requirement is analogous to a signature on a printed document and is implemented in the document authentication apparatus electronically through the use of both hardware and software. A program which immediately checks the identicalness of the document at the transmitting and receiving station through a high speed comparison, locks in the document such that no modification can occur and then awaits authentication handshakes from the two end points. Such authentication is real-time and can be both hardware and software executable, i.e., password and physical confirmation.

20 Claims, 5 Drawing Sheets

DOCUMENT AUTHENTICATION APPARATUS

This is a divisional of application Ser. No. 471,570, filed Jan. 29, 1990, now U.S. Pat. No. 4,981,370, issued Jan. 1, 1991.

FIELD OF THE INVENTION

This invention relates to computer systems and, in particular, to apparatus for providing a document authentication and authenticity capability for the computer system, to produce an electronic document which satisfies the legal requirements for contracting as applied to printed documents.

PROBLEM

It is a problem in the field of computer systems to produce an electronic document that satisfies all the legal requirements associated with printed documents. Despite the availability of high technology in the field of electronic communication and record keeping, the business world almost exclusively relies on the generation and exchange of paper to consummate business transactions and to run day to day business operations. The predicted paperless office has failed to become a complete realization due to the difficulty in satisfying several significant legal issues with respect to electronic contracting: the requirement of a writing, the need for authenticating signatures that indicate the terms and conditions of an agreement are truly acceptable to both parties, and the question of document authenticity.

In a typical business transaction, two parties meet with the intent to reach an agreement with respect to the sale of merchandise. The parties exchange verbal understandings. At some point these verbal understandings are put down on paper through the use of a word processor. A first draft is generated. The draft is sent by the vendor to the buyer. The buyer revises this draft copy and sends it back to the vendor. This process generally takes several iterations between the parties before a final written contract is approved and executed to consummate the deal. The contracting parties may take advantage of a computerized word processor that electronically retains the document on magnetic media (tape, disk) to allow easy retrieval, modification, transmission and storage. Document transmission between parties can be accomplished by teletype/facsimile and overnight mail. Alternatively, the majority of large corporations operate an electronic mailing system allowing them to relay documents to branch offices free from the postal system's constraints. Additionally, teleconferencing allows geographically separated people to conduct a group conference without travel. In this way, compromises and solutions may be agreed upon in real time. A similar problem exists in the realm of single party documents, such as wills, affidavits, etc. These legal documents are required to be in writing and authenticated by the party to be bound by the contents of this document.

Despite the availability of these technological advances, there remains a paper proliferation. Paper copies still serve as the standard and accepted way of contracting. Why the dependency on paper? Perception. The nature of electronic expressions raise issues of security, tangibility, reliability, authentication, longevity and validity. There is presently no electronic system that provides all of the safeguards and satisfies all of the legal requirements associated with paper documents. Therefore, electronic contracting has not been a viable alternative to paper documents.

SOLUTION

The above described problems are solved and a technical advance achieved in the field by the present document authentication and authenticity apparatus. This apparatus produces a final authenticated document using computerized techniques, which document satisfies the legal document authentication and authenticity requirements traditionally associated with printed documents. In addition, this apparatus eliminates many of the problems spawned by execution of paper contracts and the use of the postal service, such as the "battle of the forms" and the "mailbox rule".

The document authentication apparatus offers a number of hardware/software architectural options to provide document authentication and authenticity capability. Document authentication requires that the person to be charged apply an authenticating mark on the document indicating intent to authenticate the document. This requirement is analogous to a signature on a printed document and is implemented in the document authentication apparatus electronically through the use of both hardware and software.

The document authentication process is activated as part of a program which verifies the identicalness of the document at the transmitting and receiving station through a high speed comparison, locks in the document such that no modification can occur and then awaits authentication handshakes from the two end points. Once the identities of the signatories of the document are verified, the document authentication apparatus prompts the parties to authenticate the document by appending an electronic signature thereto. The actual "signing" or authenticating of the electronic document can be implemented as an additional password step utilizing personnel identity validation apparatus. Therefore, two levels of password protection can be used such that there exists a separate "document authenticating password". Obviously, the more sophisticated the system, the more assured the court will be that the document authentication is valid. A single party authentication procedure is also included in this system to execute single party documents, such as wills, affidavits, etc. in a manner analogous to the multi-party contract.

The authentication of the document by the contracting parties consummates the execution of the document. The document authentication apparatus responds to the authentication operation by providing sufficient safeguards to insure that the contents of the file have not been modified or altered following the consummation of the multi-party contract single party document without the alteration being detectable. This is typically accomplished by the generation of a "digital signature" that "fingerprints" the document such that not even a single bit of the document can be altered without this change being reflected in the digital signature. The authenticated document with the digital signature appended thereto can then be electronically archived on electronic media as a permanent document.

In this manner, no paper document version of this electronic contract need be produced. All the traditional elements of a paper contract are present in electronic form in the computer system. Each of these elements satisfy the traditional legal requirements for paper contracts, wills or other legal documents thereby implementing an electronic contract.

DETAILED DESCRIPTION

Figure 1:
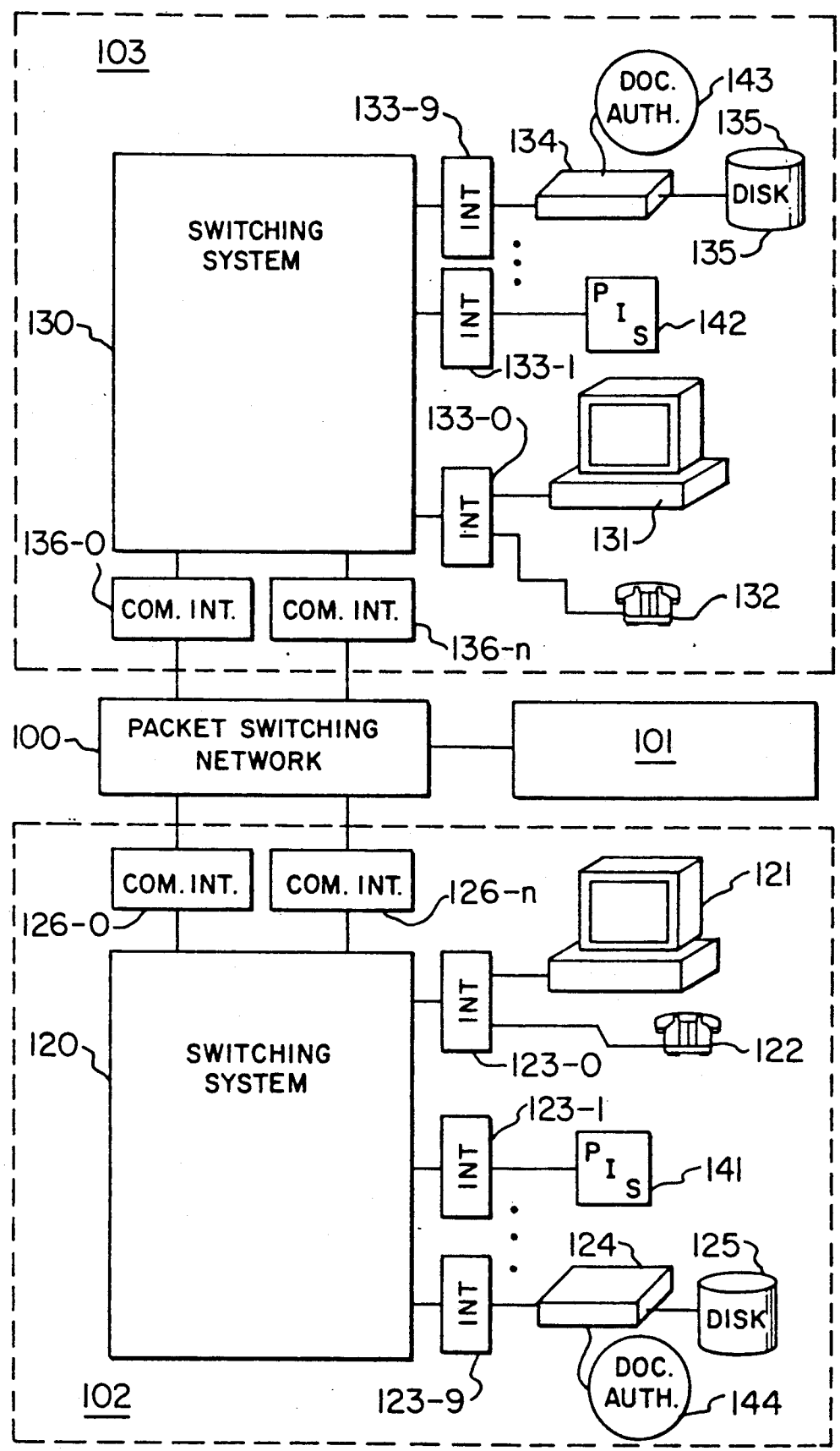
FIG. 1 illustrates, in block diagram form, the structure of a multi-processor environment in which the document authentication apparatus is installed on one or more of the processors.

The present document authentication apparatus produces a final authenticated document using computerized techniques, which document satisfies the legal document authentication and authenticity requirements traditionally associated with printed documents. In addition, this apparatus eliminates many of the problems spawned by execution of paper contracts and the use of the postal service, such as the "battle of the forms" and the "mailbox rule".

The document authentication apparatus offers a number of hardware/software architectural options to provide document authentication and authenticity capability. Document authentication requires that the person to be charged apply an authenticating mark on the document indicating intent to authenticate the document. This requirement is analogous to a signature on a printed document and is implemented in the document authentication apparatus electronically through the use of both hardware and software. The actual "signing" or authenticating of the electronic document can be implemented as an additional password step utilizing personnel identity validation apparatus. Therefore, two levels of password protection can be used such that there exists a separate "document authenticating password."

A program which immediately checks the identicalness of the document at the transmitting and receiving station through a high speed comparison, locks in the document such that no modification can occur and then awaits authentication handshake from the two end points in a two party contract. In a single party document case, the program locks in the document such that no modification can occur and then awaits the authentication handshake from the party who authenticates the document. Such authentication is real-time and can be both hardware and software executable, i.e., password and physical confirmation. Obviously, the more sophisticated the system, the more assured the court will be that the document authentication is valid, and that the contents of the file have not been modified or altered following the consummation of the contract without the alteration being detectable.

Requirement of a Writing

The legal requirements for a contract have their origins in the traditional paper methods of business transactions. One of these key legal requirements is the Statute of Frauds. Under the Statute of Frauds, if the contract takes longer than one year to perform or involves a monetary sum greater than $500, it must be in writing. The writing must specify all the terms and conditions of the contract. Mutual assent to these terms and conditions must be demonstrated by an authenticating mark, typically the signature of both parties. The rationale behind the Statute of Frauds is to provide a writing which will afford a basis for believing that the oral evidence offered rests on a real transaction and to ensure the valid existence of a contract. Thus, a writing is required to provide evidence of a valid agreement between the parties.

The writing requirement of the Statute of Frauds can be satisfied by handwritten or typewritten versions of a document or by telegram. A telegram is generated as electrical signals transmitted over electrical conductors or microwave transmissions. A transmission which generates a telegram is clearly an intangible method of exchanging information to produce a human readable document—a printout. A computer transmission is another intangible method of exchanging information to produce a human readable document. Both the telegram and computer methods of contracting should satisfy the Statute of Frauds in that both transmissions can be reduced to a human readable document.

The computer media on which an electronic contract is stored as data also provides a permanent record to which a court can turn in the event of a dispute. The lifetime of computer media and the state of the art in storing this media not only ensures the existence of a representation of the parties' understanding, but endures beyond the lifetime of paper. Should the contents of an electronic contract be brought into question, the data comprising the terms and conditions of the electronic contract is immediately retrievable and transformable to a human readable document.

Requirement of an Authenticating Signature

Another requirement issue which becomes evident under the Statute of Frauds in regard to the use of electronic contracts is the signature requirement by the person to be charged. The Uniform Commercial Code (UCC) defines "signed" to include "any symbol executed or adopted by a party with present intention to authenticate a writing." The term "authentication" is included to "make it clear that a complete handwritten signature is not required." A signature appended to a contract must establish an "evidentiary connection to the signatory." As discussed subsequently, the state of the art does not preclude the ability to authenticate in the context of electronic contracting. Additionally, the present laws may be interpreted to encompass state of the art authenticating methods.

*American Jurisprudence* on the Statute of Frauds states that:

> the signature must be made or adopted with the declared or apparent intent of authenticating the writing relied upon as a memorandum, and not by way of mere recital or identification. Especially if the signature is affixed by means other than the hand of the signer, ... it is essential that the act be done with intent to authenticate the instrument.

Document Authenticity

In the above analysis, every issue presented rests upon the credibility of the computer data that represents the contract. The viability of such a contract requires strict adherence to an ordered data file security procedure. These document authenticity safeguards must ensure that the document has not been altered since unauthorized modifications to computer media expressions are not easily detectable. Therefore, to satisfy the document authenticity requirement of identical terms and conditions, the generally accepted criteria of a locked file cabinet, valid signature, file security and acceptable mode of "sending" the contract must be met. The computer and its peripheral equipment must ensure the presence of the above-identified four factors.

The equivalent to the paper requirements must be first, the locked file cabinet demonstrated in the computer environment of files stored on the computer disk. Second, the equivalent of traditional "signing" must be demonstrated. Third, a clear demonstration that no unauthorized modifications were made to the computer expressions. Finally, electrical representations must follow the same transmission security requirements ascribed to traditional contracts transmitted by mail. The following description indicates some of the elements provided in the present document authentication system to satisfy each of these requirements.

Document Access

The first step in ensuring proper document authenticity, as a minimum requirement, simple physical restrictive access to the computer should be implemented. In other words, by simply locking the doors to the computer system and its associated terminals, a modest security procedure is in place. Computer access can be achieved via telephone lines by any average computer hacker. Therefore, a variety of hardware and software methods exist to ensure that the locked file cabinet equivalent exists. For example, a callback modem can provide additional security from intruders. This device responds to a person calling the computer by requesting that the person identify themselves. The computer then disconnects from the call and telephones the identified caller at a predesignated telephone number stored in the computer memory and associated with the identified caller. This type of security arrangement, although more sophisticated than a locked room, is still subject to circumvention. Therefore, the state of the art offers still more sophisticated methods of preventing access, and, in particular, access to the computer files.

Passwords are typically used to validate the identity of the user. The software operating the computer prompts the user to enter a password that is theoretically known only to the user before access to the computer's files is granted. Therefore, access is password protected such that only a single user may gain entry. The accuracy of user identity validation can be improved by the addition of various peripheral devices that measure some immutable physical characteristic of the user. These devices include fingerprint scanners, voiceprint identifiers, retina scanners, etc. Each of these devices can be preprogrammed to respond to only the authorized user and operate with a high level of confidence. Clearly, sophisticated hardware and software methods exist to secure access to computer files, i.e., the locked cabinet analogy.

Document Authentication

The state of the art also offers hardware/software architectural options to provide document authentication capability. Document authentication requires that the person to be charged apply an authenticating mark on the document indicating intent to authenticate the document. This analogy to the signature is also electronically viable through the use of hardware and software. The actual "signing" or authenticating of the electronic document should be implemented as an additional step utilizing the above described technology. Therefore, two levels of password protection can be used such that there exists a separate "document authenticating password."

A program which immediately checks the identicalness of the document at the transmitting and receiving station through a high speed comparison, locks in the document such that no modification can occur and then awaits authentication handshake from the two end points. Such authentication is real-time and can be both hardware and software executable, i.e., password and physical confirmation. Obviously, the more sophisticated the system, the more assured the court will be that the document authentication is valid, and that the contents of the file have not been modified or altered following the consummation of the contract without the alteration being detectable.

Document Authenticity

One method of ensuring document authenticity is the use of a "digital signature." Computer software which employs a complex mathematical formula produces a series of 0 and 1 bits that are appended to the file to uniquely identify the contents of the file. This is accomplished by the use of a "hashing routine" that uses each character in the file in a complicated mathematical computation to obtain, for example, a 128 character digital signature. Thus, the digital signature is dependent on the contents of the file and if even a single bit of the file is changed, the digital signature does not match. If a single character of the file is changed, then approximately 50% of the characters in the digital signature will change. The probability of two documents having the same digital signature using this procedure is less than one in 1,000 trillion. This adequately ensures that the contents of the original contract cannot be altered without the modification being detectable.

File Transmission

Alterations of the contract during transmission is particularly a concern with respect to written and electronic contracts. The written document can easily pass through human hands that can expertly alter the contents of the paper expression. Detecting a switch in paper documents is nearly impossible. Electronic document transmission is clearly superior to paper documents in that sophisticated technology not only allows for secure transmissions, but offers technology to detect any tampering. If security is not a factor and the document is sent via common carrier telecommunication facilities, the transmission is sent concurrently with many other transmissions. Anyone can access these transmissions, but finding a specific transmission and associating it with a particular sender is difficult considering the number of communication channels supported by one common carrier facility. Physical "wiretapping" requires access to a user's facilities, and thus, is equally prohibitive if adequate on site security measures are employed.

An additional level of security is obtained by the use of encryption, where the entire document is translated into coded form using a secret cipher key. This protects the document from being read by third parties, but does not protect sender and receiver from fraud committed by each other, since both have knowledge of the cipher key. More complex encryption systems that use a third party trustee are available, but are costly to implement. Therefore, technology exists which serve to secure transmissions and permit authentication of agreed upon terms and conditions. The National Bureau of Standards has adopted an encryption algorithm known as the Data Encryption Standard (DES). This encryption key uses 64 bits and therefore does not require much processing time or assume much storage space. Additionally, the associated software is relatively inexpensive. A more secure and complex system that minimizes the possibility of fraud by the contracting parties is the RSA Public Key Cryptosystem. This system uses two encryption keys. A "private key" is used by the document sender to scramble the data while a "public key", known to the document recipient, is used to decode the received document. Since the registered public key will unscramble only data that was scrambled with the private key, the parties can identify each other. This system is analogous to handwritten signatures in that the electronic signature can be verified but not easily forged. This system can be used in lieu of the above described DES system where the trustworthiness of the other party is in doubt.

System Architecture

The document authentication apparatus is typically installed as part of a computer system, either a personal computer or a minicomputer. The apparatus illustrated in FIG. 1 represents the interconnection of a plurality of processors, each of which is associated with one of the parties to a contract negotiation, and one or more of which processors are equipped with the document authentication apparatus. These parties can be geographically separated, such as in different parts of the country, or can be within the same building.

A typical system installation 102 can be processor 124, equipped with disk memory 125, personnel identification apparatus 141 and one or more terminals 121. The party at terminal 121 is also equipped with a telephone 122 for voice communication with the other parties to, the contract negotiation. A communication interface 123-0 is provided to interconnect terminal 121 and telephone 122 via voice/data interface 123-0 and leads 127-0. In addition, switching system 120 interconnects via trunk circuits 126-0 to 126-n to the common carrier communication facilities, represented in FIG. 1 as packet switching network 100. The switching system 120 can be a telephone switching system that establishes voice communication connections from telephone station set 122 and data communication connections from terminal 121 and processor 124 to packet switching system 100. In many existing telephone switching systems, the voice and data communication connections are established independent of each other via distinct communication paths. In addition, processor 124 is equipped with document authentication software 144 that is described in detail below. The document authentication software 144 provides control of the documentation authentication process and provides all the elements necessary to satisfy the legal requirements of a contract.

Another alternative typical system installation 103 can be processor 134, equipped with disk memory 135 and personnel identification apparatus 142. Processor 134 is also equipped with document authentication software 143 that is described in detail below. The document authentication software 143 provides control of the documentation authentication process and provides all the elements necessary to satisfy the legal requirements of a contract. In addition, one or more personal computers 131 provide distributed processing capability. The user at personal computer 131 is also equipped with a telephone 132 for voice communication with the other parties to the contract negotiation. A voice/data communication interface 133-0 is provided to interconnect personal computer 13 and telephone 132 with switching system 130. In addition, switching system 130 is connected via trunk circuits 136-0 to 136-n with the common carrier communication facilities, represented in FIG. 1 as packet switching network 100. The switching system 130 can be a telephone switching system that establishes voice communication connections from telephone station set 132 and data communication connections from processor 134 and personal computer 131 to packet switching system 100. In state of the art telephone switching systems, the voice and data communication connections are established as a single combined communication connection. The present such combined communication connections are referred to as Integrated Services Digital Network (ISDN) connections. The ISDN communication methodology provides a combined voice/data communication path that integrates telephone station set 132 with personal computer 131 to enable the user to have the full spectrum of communication capability with the other parties via a single interface and communication connection.

The final computer system 101 illustrated as a block in FIG. 1 and parallels the structure of system installation 102 or 103 and is illustrated for the purpose of discussing three party contracts and/or the use of a third-party trustee as is described in further detail below.

Documentation Authentication Software

Figure 2:
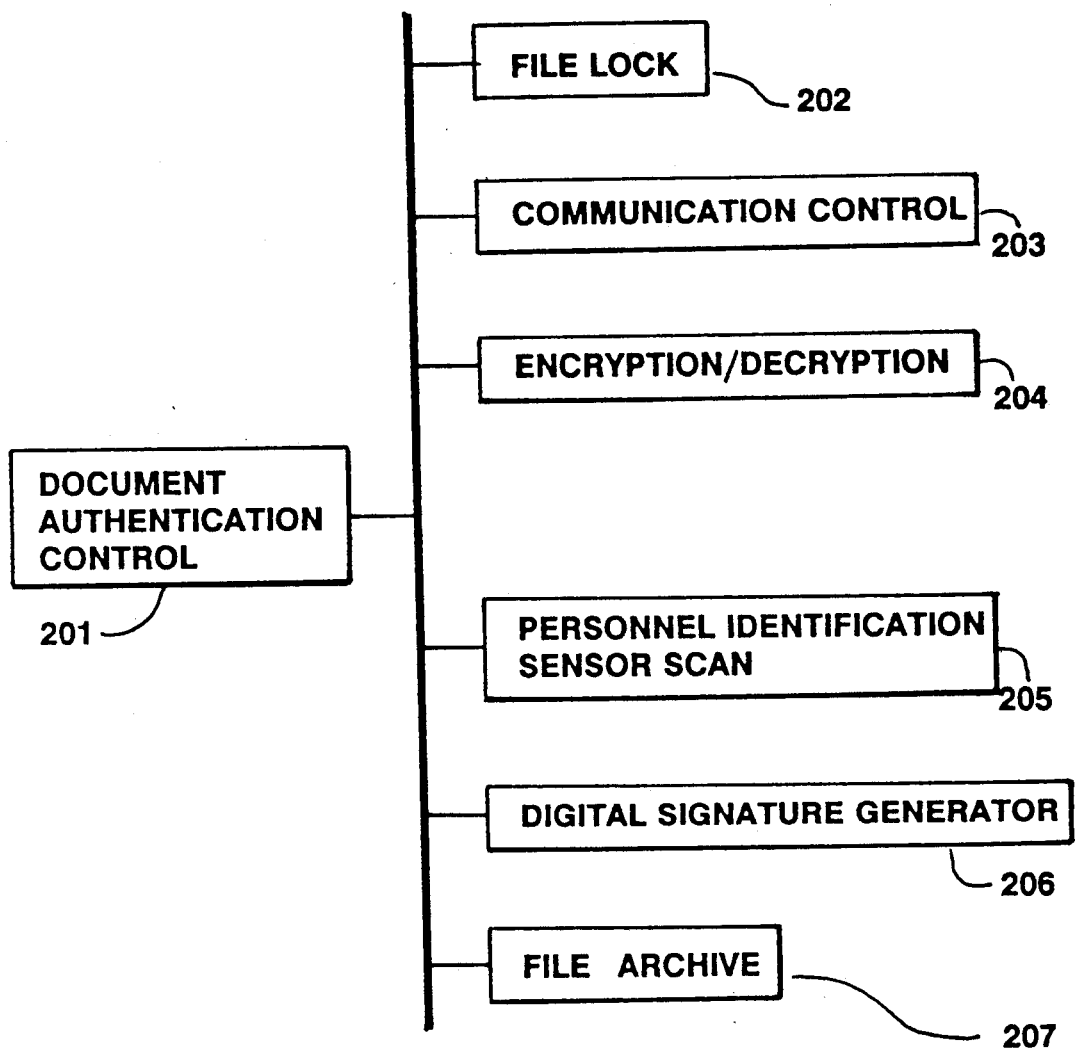
FIG. 2 illustrates, in block diagram form, the structure of a typical document authentication apparatus.

The document authentication software, such as 143, is illustrated in further detail in FIG. 2. This software includes document authentication control element 201 which serves as the basic program control block. Various subroutines (202-207) are connected to document authentication control 201 to provide the specialized features and hardware control elements. File lock element 202 controls access to the document or file such that only the contracting parties can access the document. Access to the document is rigorously controlled to prevent tampering with the document contents during editing and execution. Communication control element 203 manages all communication among the processors to limit the possibility of unauthorized users from accessing the document. Encryption/decryption element 204 provides the capability to encode and decode the document for transmission over the packet switching network 100 to prevent interception of the document contents during the transfer of the document among the parties. The personnel identification sensor scanner element 205 provides control over the parties identification verification process. Digital signature generator element 206 produces a digital signature that is appended to the final signed document to prevent the contents of the document from being altered without detection. The digital signature thereby supplies document content validation for archival purposes. The file archive element 207 relocates the executed document to a secure data storage media location for long term archival purposes. This element also manages the file lock and access control software that prevents unauthorized or inadvertent file access.

Document Authentication Process

Figure 3:
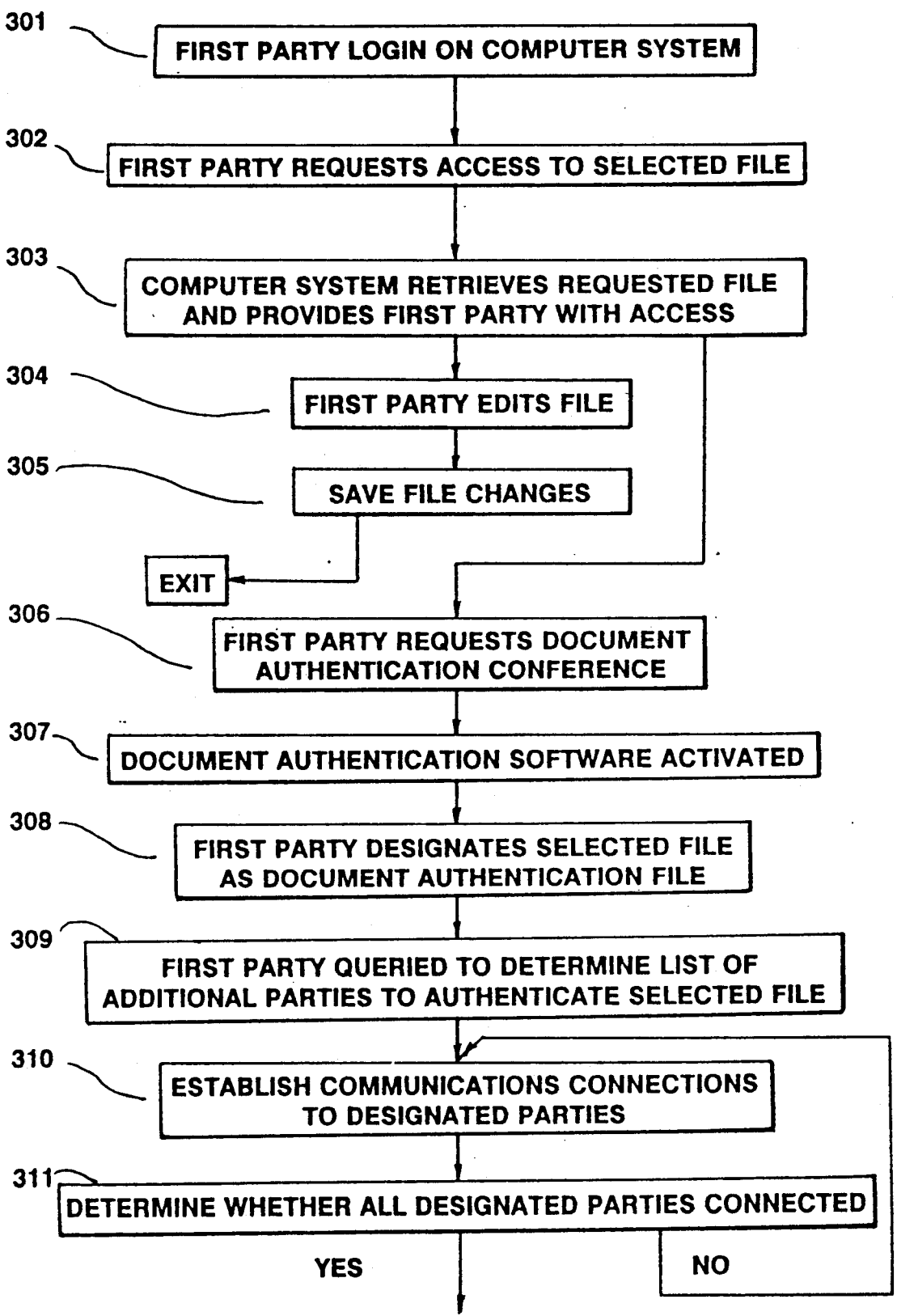
FIGS. 3 to 5 illustrate, in flow diagram form, the operational steps of a document authentication process.
Figure 4:
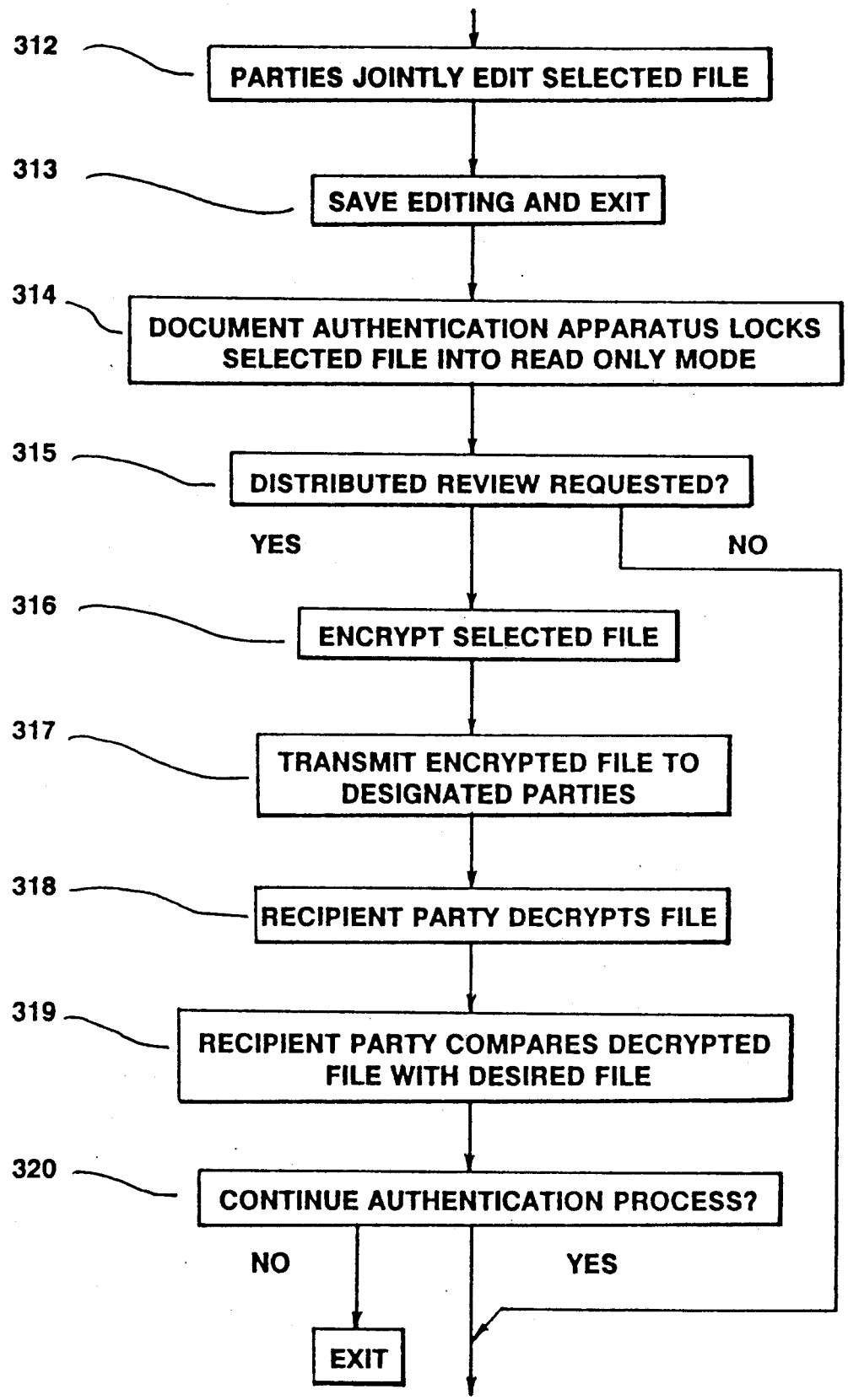
Figure 5:
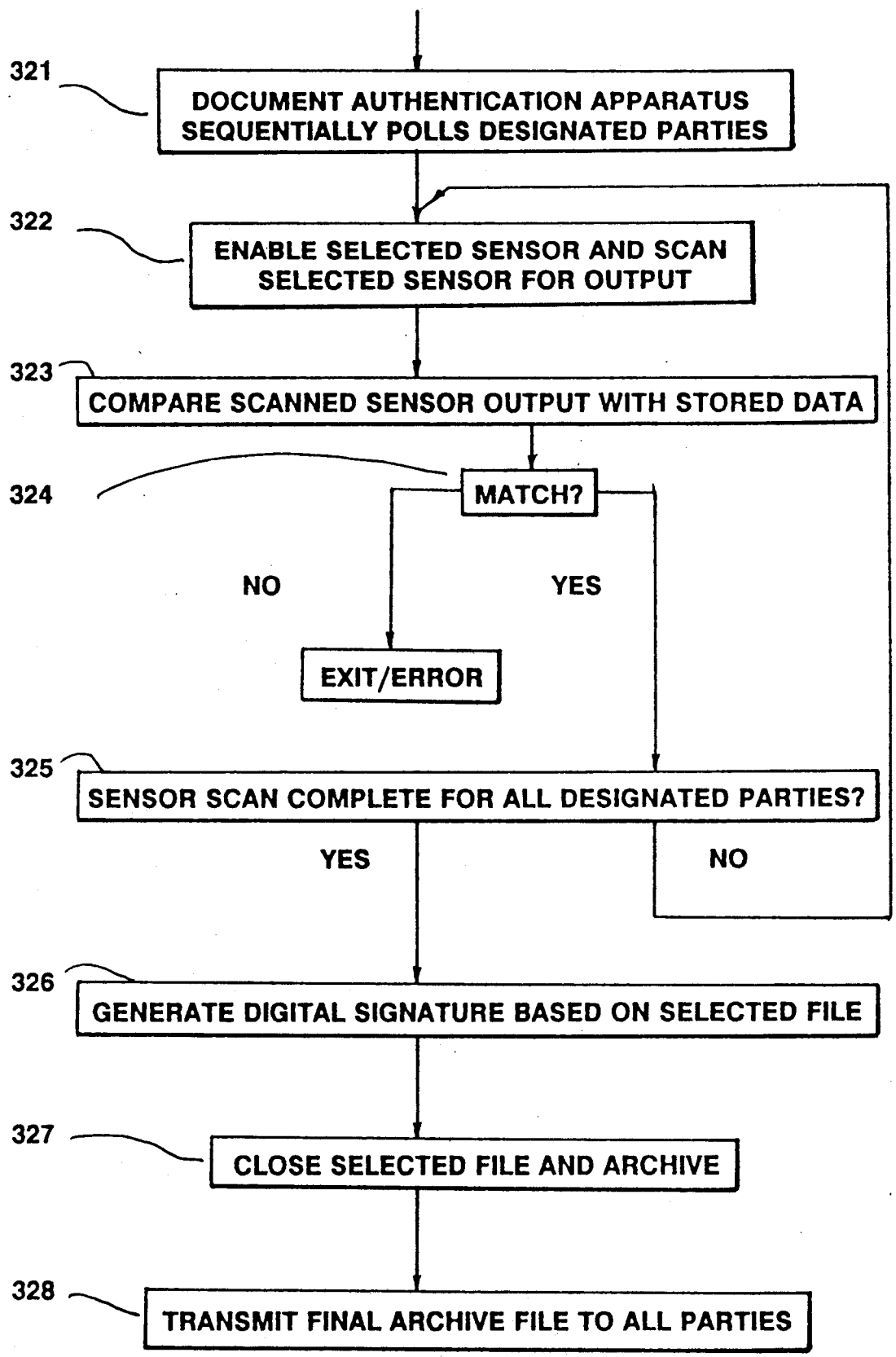

In order to more fully understand the operation of the document authentication apparatus, the process of authenticating a document is described in flow diagram form in FIGS. 3 to 5, with reference to the hardware and software elements of FIGS. 1 and 2. In this process it is assumed for the purpose of discussion, that a user at system installation 102 is creating and executing a single party document, such as a will. In addition, at least one additional party is available to serve as a witness to the authenticating of the document by this user or to act in an advisory capacity during the creation of this document. These two parties are not colocated and for description purposes are assumed to be located in Seattle, Wash. and Omaha, Nebr., respectively. The two parties are linked by the common carrier facilities 100 available to the public, such that both voice and data communications are concurrently carried via these common carrier facilities 100 between the two parties. For simplicity of description, it is assumed that the document or contract of interest to the two parties resides on processor 134 although copies of this document can also be stored on personal computer 131 and processor 124.

Document Editing

The document editing process typically begins with the individual (first party) logging on to processor 134 and accessing a file. This is accomplished at step 301 by the individual at personal computer 131, for example, unlocking the personal computer 131 with a key as is found on the IBM personal computers. The individual then establishes a data communication connection via voice/data interface 133-0, switching system 130, voice/data interface 133-9 to processor 134. Once connected to processor 134, the individual logs into the processor 134 at step 301 by providing a user identification password in response to a prompt from processor 134. This password should be known only to the individual and uniquely identifies the individual to processor 134, thereby preventing unauthorized parties or other users from accessing the individual's files resident on processor 134. At step 302, the individual requests access to a file named document for the purpose of editing this file. If this file is stored in cache memory of processor 134, it is immediately transmitted to and displayed on the screen of personal computer 131. If the file is archived in disk memory 135 at step 303, processor 134 requests file document from disk memory 135 that serves processor 134. In response to such a request, disk memory 135 transfers file document to processor 134 which transmits file document via switching system 130 to personal computer 131, where the file is displayed for the individual to edit.

If the individual elects to unilaterally edit the file document, this is accomplished in well known fashion at step 304. The edited file can be saved at step 305 and editing terminated. Alternatively, at this juncture, or even at step 304, the individual (first party) can request the addition of the other contract parties (second party) who is a user on processor 124 and who may function as an advisor, witness or an assistant document editor. This is accomplished by first party requesting access to the document authentication software 143 resident on computer 134 at step 306. Document authentication software 143 interfaces with first party via document authentication control 201 which provides a user friendly interface to enable a user to step through the document authentication process.

File Lock

Document authentication control 201 at step 307 produces a user prompt/query or a menu to enable first party to signify the requested action. For example, first party at step 308 designates file "contract" as the document of interest. Document authentication control 201 activates subroutine file lock 202 which loads file "contract" into the document authentication software 143 and prevents uncontrolled access or modification of this file. At this stage, the file can be edited by preauthorized users (the contracting parties): first and second parties.

Communication Control

Once the file "contract" is loaded, first party, in response to a query from document authentication control 201, requests that a communication connection be established to second party. Document authentication control 201 activates communication control 20 to establish voice and data communication connections to second party. This is accomplished by communication control 203 at step 309 either querying first party or accessing a predetermined list of contracting parties to obtain the identification of the contracting parties for the file "contract". At step 310, communication control 203 establishes data communication connection via communication interface 133-9, switching system 130, communication interface 136-0, packet switching system 100, communication interface 126-0, switching system 120, communication interface 123-0 to processor 124 and terminal 121. Concurrently, switching system 130 may establish a voice communication connection from telephone station set 132, voice/data communication interface 133-0, switching system 130, communication interface 136-0, packet switching system 100, communication interface 126-0, switching system 120, voice/data communication interface 127-0 to telephone station set 122. The second party at terminal 121 can access file "contract" as if it were resident on processor 120 and can simultaneously discuss the contents of file "contract" via telephone station set 122. Thus, both first party and second party concurrently view the same document on their respective terminals 131, 121 and can exchange verbal communication via their respective telephone station sets 132, 122. In this fashion, the contract can be edited in real time and a more timely resolution of differences reached.

Alternatively, second party at terminal 121 can be connected on a data communication connection via voice/data communication interface 123-0, switching system 120, data communication interface 123-9, processor 124, data communication interface 123-9, switching system 120, communication interface 126-0 to packet switching system 100. The exact details of the voice and data communication connections are a function of the implementation details of the switching systems and the computer equipment used.

Additional parties can be added seriatim to this voice/data communication connection if a plurality of contracting parties are required. This is accomplished at step 311 by the step of determining whether all the requested parties, as described in the preassigned list or as entered by first party, have been connected together. If all parties are not yet connected, processing returns to step 310 where another communication connection is established. For the purposes of simplicity, only a two party connection is described herein. Communication control 203 therefore views the communication connections as the interconnection of first party at one of the communication lines of switching system 130 with at least one other contracting party connected to corresponding ones of communication interfaces 136-0 to 136-n that interconnect these other contracting parties with system installation 103 via packet switching system 100.

Editing of the file "contract" can now be accomplished by the plurality of contracting parties in real time at step 312. All the contracting parties (first and second) have editing capability via their respective terminals 131, 121 and voice communication capability via their respective telephone station sets 132, 122. If the parties agree to store and not authenticate this file, at step 313 document authentication control 201 proceeds to store and lock the file "contract". This is controlled by file lock software 202 which disconnects the parties from the communication connections and proceeds to store and lock the file "contract" in memory such as disk drive 135.

If the individual (first party) to be bound by the document elects to authenticate the file document, at step 314 document authentication control 201 activates file lock software 202 to place the file document in a read-only mode for authentication purposes to prevent any further changes to this file by any of the contracting parties, to thereby avoid tampering. At step 315, document authentication control 201 queries all the parties to determine whether distributed review of the file "contract" is desired. If not, the authentication process continues at step 321 where the personnel identification process is initiated. However, if distributed review is requested, the document authentication control 201 at step 316 enters the encryption session of encryption/decryption software 204.

Encryption/Decryption of the File Contents

At step 316, encryption/decryption software 204 encrypts the file document using one of the well-known processes described above, such as the Data Encryption Standard. At step 317, encryption/decryption software 204 requests communication control 203 to transmit the encrypted file to all the parties via the existing communication connections. Once the encrypted file has been received by the parties, each party can use decryption software, resident on their respective processors 124, 134, to decrypt the received encrypted file at step 318. The processors 124, 134 can then at step 319 compare the decrypted file to their copy of the file as recorded in their "own copy" version to insure that no discrepancies exist in the file "contract" as presently stored in the locked file form in document authentication software 143. At step 320, each user can elect to exit from the authentication process or continue with the formalization of the file "contract". An alternative to distributing the file to all the contracting parties is for document authentication software 143 to compare the copy of the file stored on processor 124 with the copy of the file stored on processor 134 for identicalness. Then, at step 316, processor 124 encrypts the version of file "contract" that is stored on processor 124 and transmits the encrypted file at step 317 to processor 134 over the above-described data communication connection. The recipient party at processor 134 is document authentication software 143 which decrypts the received encrypted file and at step 319 compares the received decrypted file with the version stored on processor 134. If the two versions of the file "contract" match, at step 320, the document authentication process continues as noted above.

Personnel Identification Sensors

The above-described two party editing and review process may be bypassed in the case of an individual creating and authenticating a document without assistance. In either case, the personnel identification process is initiated at step 321 by the individual (first party) to be bound by the file "document" assenting to the form and content of the file "document" as is presently stored in the document authentication software 143. The assent is obtained by personnel identification process 205 polling the individual (first party) to obtain initial confirmation that authentication is appropriate. At step 322, personnel identification process 205 enables and scans a sensor (ex. device 142) associated with the first party. The sensors, as described above, can be as elemental as a prompt to the terminal associated with the selected party to enter a password that is theoretically known only to the selected party. The accuracy of personnel identity validation can be improved by the addition of various peripheral devices 142, 141 that measure some immutable physical characteristic of the party. These devices include fingerprint scanners, voiceprint identifiers, retina scanners, etc. Each of these devices can be preprogrammed to respond to only the authorized party and operate with a high level of confidence. Therefore, the personnel identification process 205 can signal a peripheral device 142 that is colocated with the selected party's terminal 131 to obtain data therefrom indicative of some selected immutable physical characteristic of the selected party. At step 323, personnel identification process 205 compares the data received from the selected sensor 142 with data stored in its memory indicative of the correct party identification. Some sensors 142 themselves include preprogrammed data that performs the comparison test and outputs a confirmation or a denial of the party's identification. At step 324, if there is not a match, processing is aborted and an error condition is reported to all parties. If a validation is determined at step 324, the document authentication process is completed since the first party has authenticated the document. However, if the first party wishes to have additional parties also sign the document, then the next party, for example a witness to the process is confirmed until all the parties are determined at step 325 to have been validated. Once validation of the identification of all the contracting parties is obtained, then the file "document" is "signed" by all the parties and the legal document has been executed electronically. An example of such a document is a will, signed by the first party and witnessed by several other parties. In such a situation, it is typical to have all the parties colocated so the witnesses can attest to the first party signing the document by placing their signatures electronically on the document. Since the witnesses can attest to witnessing the signing of the document, not the contents of the document, the entire document review process noted above would not include these other parties (witnesses).

Digital Signature Generator

In order to insure the credibility of the executed file "contract", document authentication software 143 can append a digital signature to the executed file to prevent undetected unauthorized tampering with the contents of the file "contract". This is accomplished at step 326 by document authentication control 202 activating digital signature generator 206 to produce a digital signature based on the contents of file "contract". The digital signature can be generated by either hardware or software, depending upon the particular process selected. The digital signature is typically generated by computer software which employs a complex mathematical formula to produce a series of 0 and 1 bits that are appended to the file to uniquely identify the contents of the file. This is accomplished by the use of a "hashing routine" that uses each character in the file in a complicated mathematical computation to obtain, for example, a 128 character digital signature. Thus, the digital signature is dependent on the contents of the file and if even a single bit of the file is changed, the digital signature does not match. If a single character of the file is changed, then approximately 50% of the characters in the digital signature will change. The probability of two documents having the same digital signature using this procedure is less than one in 1,000 trillion. This adequately ensures that the contents of the original contract cannot be altered without the modification being detectable.

File Archival

Once the digital signature is produced, document authentication control 201 transfers the authenticated file and its associated appended digital signature to file archive process 207. At step 327, file archive process 207 stores the file in memory, such as disk memory 135. In addition, if so requested, copies of the file are transmitted at step 328 to all the contracting parties to provide each party with an executed digitally signed copy of the file "contract". The transmission can include encryption as described above. At this juncture, the contract has been reviewed by all parties, "signed" by all parties using special authentication processes, and "sealed" by use of a digital signature. For security purposes, the standard business practice of storing multiple copies can be used by any or all of the contracting parties. Thus, the electronic data can be stored on multiple disks or on a memory that provides a dual copy protection scheme. As can be seen from this description, no paper copy of the contract has been generated, nor needs to be produced.

Third Party Trustee

An alternative to the above-described process is the use of third party trustees. In this application, another party is added to the contract process for security reasons. The third party is a fiduciary, such as a bank, that has no proprietary or financial interest in the subject matter of the contract or any financial ties to any of the contracting parties. The third party, at system installation 101 (details not shown, but similar or identical to any of the party's computer systems) is the repository for the document authentication software and the file "contract". The third party controls the communication connections and can even provide facilities of their own at which the respective parties in Seattle and Omaha can visit to access terminals 121, 131 and personnel identification devices 141, 142 that are controlled by the third party. It is evident from the above description, that such a variation can be accomplished in straightforward fashion based upon the description provided herein.

While a preferred embodiment of the invention has been disclosed herein, it is expected that those skilled in the art can and will devise alternative arrangements that fall within the scope of the appended claims.

We claim:

1. In a data processing system that includes a processor that serves one or more data terminals, a document authentication system comprising:
   - means for interconnecting an individual at one of said data terminals with a document stored on said processor;
   - means, responsive to said individual transmitting a document authentication signal to said processor, for disabling said individual from modifying said document;
   - means, responsive to said disabling means, for authenticating said document.

2. The system of claim 1 wherein said disabling means includes:
   - means responsive to said individual inputting a document authentication request signal for validating the identity of said individual.

3. The system of claim 2 wherein said disabling means further includes:
   - means responsive to said validating means for confirming the authority of said individual to authenticate said document.

4. The system of claim 3 wherein said disabling means further includes:
   - means responsive to said validating means and said confirming means for disregarding any further document modification signals transmitted by said individual to said processor.

5. The system of said claim 2 wherein said validating means comprises:
   - means for measuring an immutable physical characteristic of said individual;
   - means for comparing said measured characteristic with data stored in a memory representative of said immutable physical characteristic of said individual as previously measured.

6. The system of claim 1 wherein said authenticating means includes:
   - means responsive to said one user inputting a document authentication request signal or validating the identity of at least one other party.

7. The system of claim 6 wherein said authenticating means further includes:
   - means responsive to said validating means for confirming the authority of said other party to authenticate said document.

8. The system of claim 7 wherein said authenticating means further includes:
   - means responsive to said disabling means and said confirming means for preventing said processor from modifying said document.

9. The system of said claim 6 wherein said validating means comprises:
   - means for measuring an immutable physical characteristic of said party;
   - means for comparing said measured characteristic with data stored in a memory representative of said immutable physical characteristic of said party as previously measured.

10. The system of claim 1 wherein said system further includes:
    - means for appending a digital signature to said authenticated document to detect any alteration of said authenticated document.

11. In a data processing system that includes a processor that serves one or more data terminals, a method of document authentication comprising the steps of:
   interconnecting an individual at one of said data terminals with a document stored on said processor;
   disabling, in response to said individual transmitting a document authentication signal to said processor, said individual from modifying said document;
   authenticating said document in response to said individual transmitting a document authentication signal to said processor.

12. The method of claim 11 wherein said step of disabling includes the step of:
   validating the identity of said individual in response to said individual inputting a document authentication request signal.

13. The method of claim 12 wherein said step of disabling further includes the step of:
   confirming the authority of said individual to authenticate said document in response to said step of validating.

14. The method of claim 13 wherein said step of disabling further includes the step of:
   disregarding any further document modification signals transmitted by said individual to said processor in response to said steps of validating and confirming.

15. The method of said claim 12 wherein said step of validating comprises the steps of:
   measuring an immutable physical characteristic of said user;
   comparing said measured characteristic with data stored in a memory representative of said immutable physical characteristic of said user as previously measured.

16. The method of said claim 12 wherein said step of validating comprises the steps of:
   measuring an immutable physical characteristic of said individual;
   comparing said measuring characteristic with data stored in a memory representative of said immutable physical characteristic of said individual as previously measured.

17. The method of claim 11 wherein said step of authenticating includes the step of:
   validating the identity of at least one other party in response to said individual inputting a document authentication request signal.

18. The method of claim 17 wherein said step of authenticating further includes the step of:
   confirming the authority of said party to authenticate said document in response to said step of validating.

19. The method of claim 18 wherein said step of authenticating further includes the step of:
   preventing said processor from modifying said document in response to said steps of disabling and confirming.

20. The method of said claim 17 wherein said step of validating comprises the steps of:
   measuring an immutable physical characteristic of said party;
   comparing said measured characteristic with data stored in a memory representative of said immutable physical characteristic of said party as previously measured.

* * * * *